US007859772B2

(12) United States Patent
Takagi et al.

(10) Patent No.: US 7,859,772 B2
(45) Date of Patent: Dec. 28, 2010

(54) COMPOSITE OPTICAL ELEMENT AND METHOD FOR MANUFACTURING THE SAME

(75) Inventors: Kazuaki Takagi, Osaka (JP); Yoshiyuki Shimizu, Osaka (JP); Toshiaki Takano, Osaka (JP); Jun Murata, Osaka (JP)

(73) Assignee: Panasonic Corporation, Osaka (JP)

( * ) Notice: Subject to any disclaimer, the term of this patent is extended or adjusted under 35 U.S.C. 154(b) by 9 days.

(21) Appl. No.: 12/304,579

(22) PCT Filed: Jun. 6, 2007

(86) PCT No.: PCT/JP2007/061466

§ 371 (c)(1),
(2), (4) Date: Dec. 12, 2008

(87) PCT Pub. No.: WO2007/145115

PCT Pub. Date: Dec. 21, 2007

(65) Prior Publication Data

US 2009/0195894 A1 Aug. 6, 2009

(30) Foreign Application Priority Data

Jun. 13, 2006 (JP) ............................ 2006-163409

(51) Int. Cl.
*G02B 9/04* (2006.01)
(52) U.S. Cl. .................... 359/796; 359/642; 359/811
(58) Field of Classification Search .............. 359/642, 359/796, 797, 811, 819
See application file for complete search history.

(56) References Cited

U.S. PATENT DOCUMENTS

| 5,361,168 A | * | 11/1994 | Arai et al. ................... 359/796 |
| 2005/0094294 A1 | * | 5/2005 | Wada et al. .................. 359/811 |
| 2007/0177282 A1 | * | 8/2007 | Makino et al. ............... 359/819 |

FOREIGN PATENT DOCUMENTS

| JP | 2001-249208 | 9/2001 |
| JP | 2001-296414 | 10/2001 |
| JP | 2001-296417 | 10/2001 |

OTHER PUBLICATIONS

International Search Report for corresponding Application No. PCT/JP2007/061466 mailed Sep. 18, 2007.
Form PCT/ISA/237, English translation, for International Application No. PCT/JP2007/061466 dated Sep. 18, 2007 (previously submitted with application on Dec. 12, 2008).

* cited by examiner

*Primary Examiner*—Darryl J Collins
(74) *Attorney, Agent, or Firm*—Renner, Otto, Boisselle & Sklar, LLP (57) ABSTRACT

The present invention belongs to a technical field related to a composite optical element including a first optical component and a second optical component coupled to the first optical component. In a composite optical element 1 including a first optical component 10 and a second optical component 20 coupled to the first optical component 10, shape accuracy of the second optical component 20 is improved to prevent reduction in optical performance. A ring member (106) is placed on a peripheral portion of a lens surface (10b) of the first optical component (10), the ring member (106) having a height h1 from the lens surface (10b) substantially uniform in a circumferential direction of the first optical component (10).

10 Claims, 6 Drawing Sheets

COMPOSITE OPTICAL ELEMENT AND METHOD FOR MANUFACTURING THE SAME

TECHNICAL FIELD

The present invention belongs to a technical field related to a composite optical element including a first optical component and a second optical component coupled to the first optical component.

BACKGROUND ART

Composite optical elements including a first optical component and a second optical component coupled to the first optical component have already been known. The composite optical element may be manufactured by moving the first optical component and a molding die having a molding surface of a predetermined shape relatively close to each other to press-mold a softened resin placed between the first optical component and the molding surface into the second optical component coupled to the first optical component.

For example, according to the disclosure of Patent Literature 1, the molding die mounted on a nut of a ball screw is linearly moved close to the first optical component by driving the ball screw to rotate by a pulse motor so that a softened resin placed between the first optical component and the molding surface is press-molded into a predetermined shape, and then the molded resin is cured. In this way, the second optical component is coupled to the first optical component. More specifically, as the molding die is moved toward the first optical component, the softened resin is pressed and extended between the molding surface of the molding die and the first optical component. Then, the molding die is stopped when it comes to a predetermined forward position. In this way, molding of the resin is completed. The molding die is controlled to stop at the predetermined forward position as the pulse motor controls an angle of rotation of the ball screw. The softened resin is molded into a predetermined shape corresponding to the shape of space left between the molding surface at the forward position and the first optical component to become the second optical component. Then, the molded resin (second optical component) is cured to be coupled to the first optical component to manufacture the composite optical element.

Patent Literature 1: Publication of Japanese Patent Application No. 2001-249208

DISCLOSURE OF THE INVENTION

Problem that the Invention is to Solve

In connection with the aforementioned composite optical element, it is important for achieving desired optical performance to improve shape accuracy of the second optical component, particularly in the thickness direction, as well as shape accuracy of the first optical component. Therefore, in the aforementioned method of manufacturing the composite optical element by moving the first optical component relatively close to the molding die to mold the second optical component coupled to the first optical component, the molding die or the first optical component has to be positioned accurately at the time when the molding of the second optical component is finished.

With use of the same pulse motor as that described in Patent Literature 1, the position of the molding die or the first optical component is determined. In this case, the positioning accuracy of the molding die or the first optical component may be improved by enhancement of rotational accuracy (resolution) of the pulse motor. However, a limit value of the rotational accuracy (resolution) restricts the positioning accuracy and therefore the shape accuracy required for the second optical component may not be ensured in some cases. Even if the rotational accuracy (resolution) of the pulse motor is enhanced to a sufficient degree, backlash may occur due to use of a drive transmission machine element such as the ball screw, which makes it difficult to position the molding die or the first optical component with accuracy at the time when the molding of the second optical component is finished.

With the foregoing in mind, the present invention has been achieved. In connection with a composite optical element including a first optical component and a second optical component coupled to the first optical component, for example, the first optical component and a molding die having a molding surface of a predetermined shape are moved relatively close to each other to press-mold a softened resin placed between the first optical component and the molding surface into the second optical component coupled to the first optical component. In this case, an object of the present invention is to position the molding die or the first optical component with accuracy at the time when the molding of the second optical component is finished, so that shape accuracy of the second optical component, particularly in the thickness direction, is improved to achieve desired optical performance.

Means of Solving the Problem

In order to achieve the object, the present invention is directed to a composite optical element including a first optical component and a second optical component coupled to one surface of the first optical component with a peripheral portion of the one surface exposed. A protrusion is placed on the peripheral portion of the one surface and the protrusion has a height from the one surface substantially uniform in a circumferential direction of the first optical component and is coupled to at least one of the first optical component and the second optical component.

The aforementioned structure may advantageously improve shape accuracy of the second optical component. More specifically, the first optical component and a molding die having a molding surface of a predetermined shape are moved relatively close to each other to press-mold a softened resin placed between the first optical component and the molding surface into the second optical component coupled to the first optical component. In this case, for example, the protrusion is placed on part of the molding die radially outside the molding surface, and then the first optical component is moved toward the molding die until the first optical component comes into contact with the protrusion. As a result, space of a predetermined shape corresponding to the shape of the second optical component is formed easily and accurately between the first optical component and the molding surface. Therefore, the composite optical element with desired optical performance may easily be manufactured.

The protrusion is configured to have a height from the one surface substantially uniform in a circumferential direction of the first optical component. Therefore, the protrusion may advantageously prevent the first optical component from tilting when the first optical component comes into contact with the protrusion to mold the second optical component into a predetermined shape. Further, a face of the protrusion opposite the face in contact with the first optical component (hereinafter referred to as an end face of the protrusion) becomes substantially vertical to the optical axis. For example, when the end face of the protrusion is used as a mounting face for mounting the composite optical element to an optical device, alignment of the optical axis may easily be performed.

EFFECT OF THE INVENTION

As described above, the composite optical element disclosed herein may advantageously improve the shape accuracy of the second optical component. As a result, reduction in optical performance may be prevented.

EXPLANATION OF REFERENCE NUMERALS h1 Height from lens surface (height from one surface)
1 Composite optical element
10 First optical component
10b Lens surface (one surface)
20 Second optical component
37 Molding die
37a Molding surface
38 Thermosetting resin (resin)
50b component surface (one surface)
106 Ring member (protrusion, abutment)
106a Cutout portion
106c Hole
108 Lens barrel
120 Separated member (protrusion, abutment)

BEST MODE FOR CARRYING OUT THE INVENTION

Hereinafter, embodiments of the present invention will be described in detail with reference to the drawings.

Embodiment 1

Figure 1:
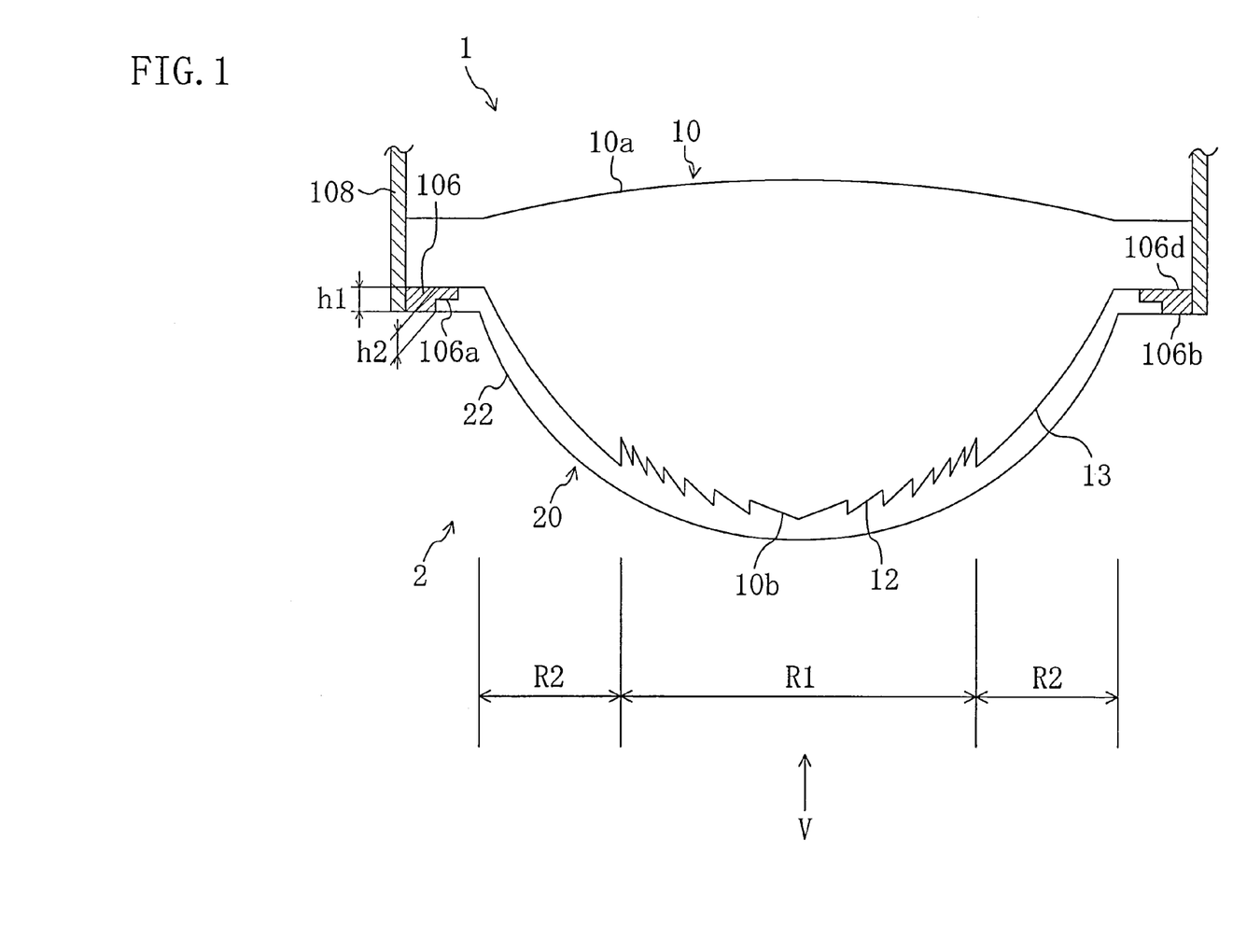
FIG. 1 is a sectional view illustrating a composite optical element according to Embodiment 1 of the present invention.

FIG. 1 is a sectional view illustrating a composite optical element 1 according to Embodiment 1 of the present invention. As shown in this figure, the composite optical element 1 includes a first optical component 10, a second optical component 20 coupled to the first optical component 10, a ring member 106 as a protrusion (abutment) and a lens barrel 108.

The first optical component 10 is configured of a biconvex lens and has a lens surface 10a in which light enters and a lens surface 10b from which the entering light is emitted. Center portions of the lens surfaces 10a and 10b bulge outward relative to peripheral portions thereof. That is, the first optical component 10 is in the so-called lentoid form.

The lens surface 10b includes an uneven region 12 in the center portion of the lens surface 10b in which depressions and projections are arranged periodically or nonperiodically and an aspherical smooth region 13 surrounding the uneven region 12. The uneven region 12 of Embodiment 1 is configured of a diffraction plane having a sawtooth section.

The second optical component 20 is coupled to the other portion of the lens surface 10b than the peripheral portion so that the peripheral portion of the lens surface 10b is exposed. An optical axis of the second optical component 20 coincides with that of the first optical component 10 (the term "optical axis" mentioned hereinafter signifies the optical axis of the first optical component 10 unless otherwise specified).

Figure 5:
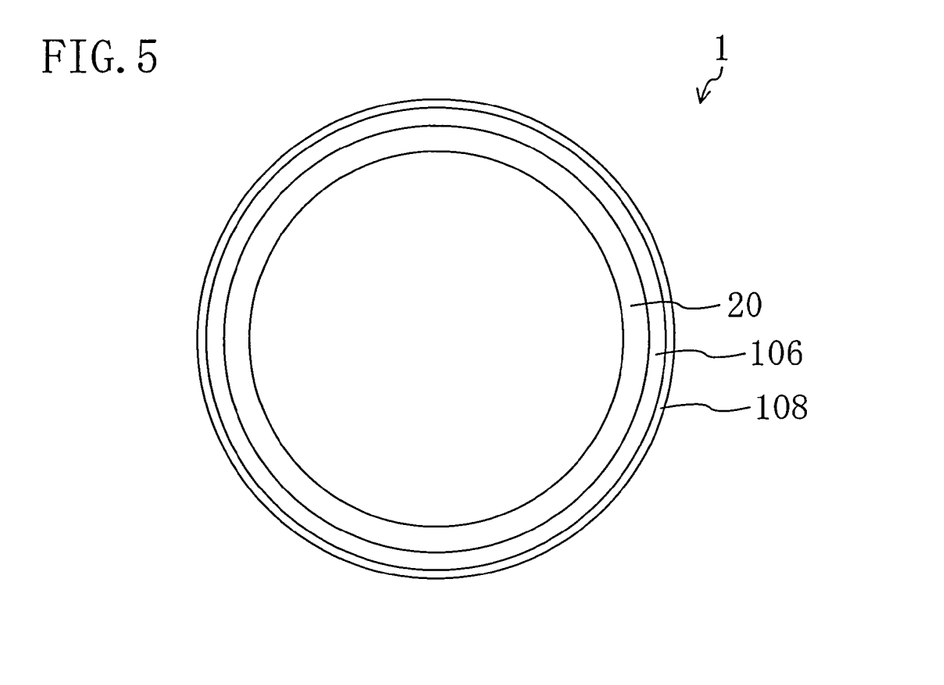
FIG. 5 is a view observed in the direction of an arrow V of FIG. 1.

The ring member 106 is placed on the peripheral portion of the lens surface 10b so that an inner circumferential surface of the ring member 106 is in contact with an outer circumferential surface of the second optical component 20 over the whole circumference and an axial center of the ring member 106 coincides with the optical axis (see FIGS. 1 and 5). An inner circumferential edge of the ring member 106 is positioned radially outside a portion of the first optical component 10 designed to function as an optical path (hereinafter the portion is called an optically effective portion). An outer circumferential edge of the ring member 106 may preferably coincide with or positioned radially outside an outer circumferential edge of the first optical component 10.

The ring member 106 is configured to have a height h1 from the peripheral portion of the lens surface 10b substantially uniform in a circumferential direction of the first optical component 10. The height h1 is equal to a height h2 of the peripheral portion of the second optical component 20. More specifically, end faces of the ring member 106 in the thickness direction are flat parallel faces opposing each other. One of the end faces 106d (hereinafter referred to as a contact face 106d) is in contact with the lens surface 10b. The other end face 106b opposing the contact face 106d is continuous and flush with the surface of the peripheral portion of the second optical component.

The inner circumferential surface of the ring member 106 has a stepped cutout portion 106a. The cutout portion 106a is formed in part of the inner circumferential surface of the ring member 106 close to the end face 106b of the ring member 106.

The lens barrel 108 is fitted on the ring member 106 so that an inner circumferential surface of the lens barrel 108 and the outer circumferential surface of the ring member 106 are in contact with each other. The lens barrel 108 extends toward the light entrance side of the first optical component 10 and functions to block unwanted light entering the lens surface 10b and support the first and second optical components 10 and 20. The lens barrel 108 is coupled to the ring member 106 by adhesive bonding. However, the coupling of the lens barrel 108 and the ring member 106 is not particularly limited to the adhesive bonding. For example, the outer circumferential surface of the ring member 106 may be press-fitted to the inner circumferential surface of the lens barrel 108.

Figure 2:
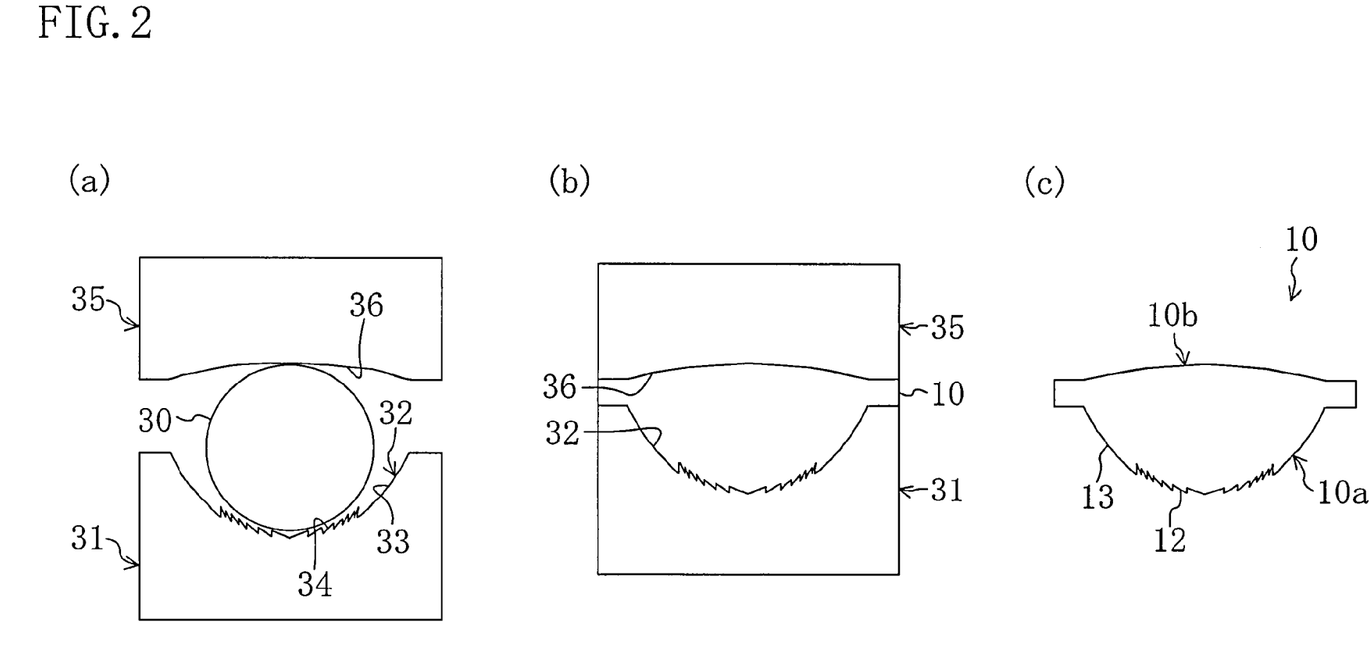
FIGS. 2A to 2C are sectional views illustrating a method for manufacturing a first optical component.
Figure 3:
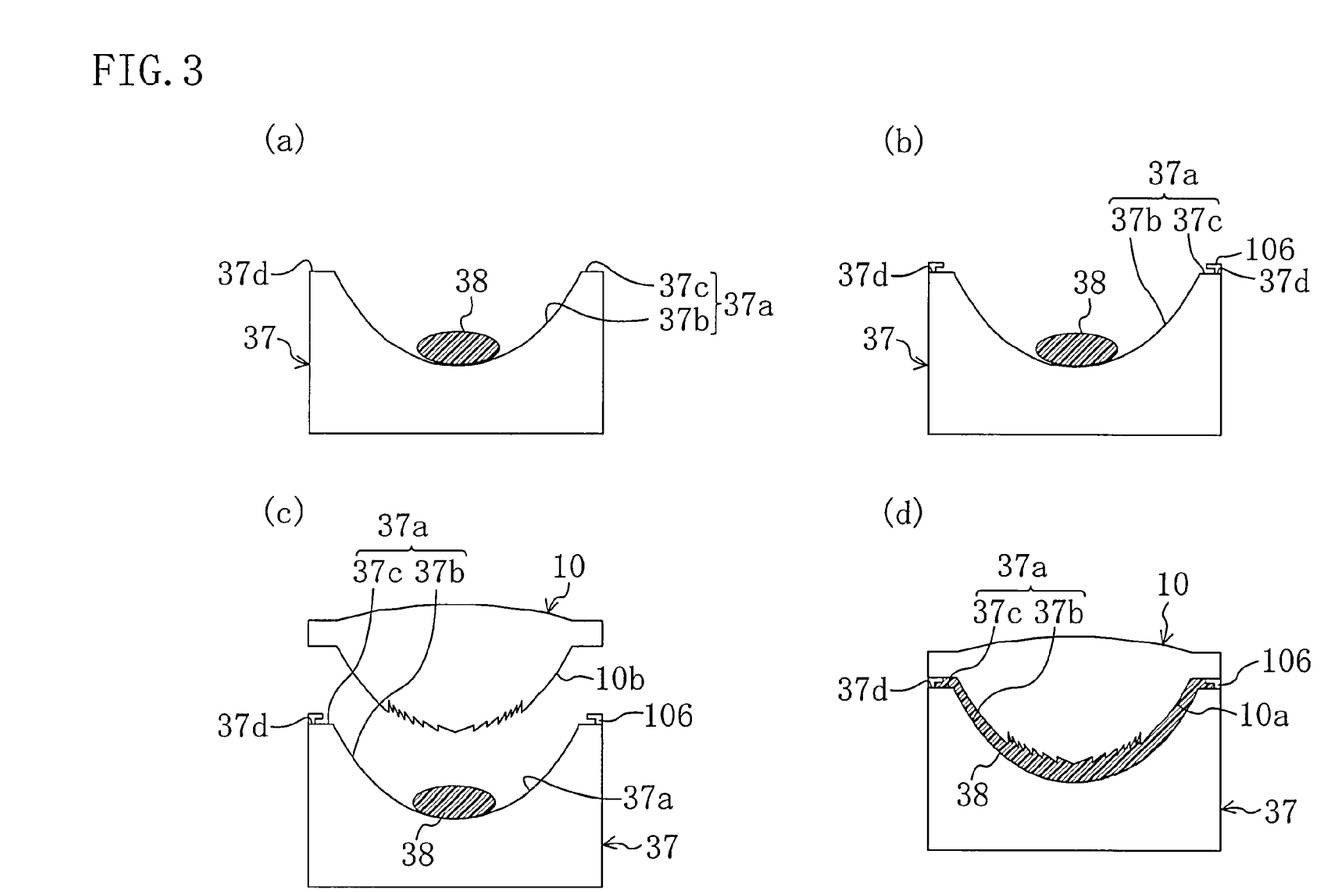
FIGS. 3A to 3D are sectional views illustrating a method for manufacturing a second optical component.

Referring to FIGS. 2 and 3, a method for manufacturing the composite optical element 1 of Embodiment 1 is explained below. In this embodiment, an example method for manufacturing the composite optical element 1 including the first optical component 10 made of glass and the second optical component 20 made of a thermosetting resin 38 (see FIG. 3) is explained.

First, the first optical component 10 is prepared. More specifically, the first optical component 10 is prepared using a pair of molding dies 31 and 35 shown in FIGS. 2A and 2B. An upper face of a lower molding die 31 is used as a molding surface 32. The molding surface 32 is used to form the lens surface 10b and includes an uneven region molding part 34 for forming the uneven region 12 (see FIG. 1) and a smooth region molding part 33 for forming the smooth region 13 (see FIG. 1). A lower face of an upper molding die 35 is used as a molding surface 36. Using the lower molding die 31 and the upper molding die 35, a glass preform 30 previously shaped into ball form or substantially the same dimension as the first optical component 10 is heat-pressed. More specifically, the glass preform 30 is placed between the lower molding die 31 and the upper molding die 35 (see FIG. 2A). Then, the glass preform 30 is softened by heating it to a temperature around the softening temperature and the upper molding die 35 is moved relatively close to the lower molding die 31 so that the softened glass preform 30 is pressed by the molding surface 32 of the lower molding die 31 and the molding surface 36 of the upper molding die 35. In this way, the first optical component 10 is molded (see FIG. 2B). After the first optical component 10 is cooled to a predetermined temperature (e.g., a glass transition temperature (150° C.)–room temperature), the first optical component 10 is separated from the lower and upper molding dies 31 and 35. FIG. 2C shows the section of the thus-prepared first optical component 10.

Next, referring to FIG. 3, a method of coupling the second optical component 20 to the first optical component 10 is explained.

First, a softened thermosetting resin 38 is placed on a molding surface 37a of a molding die 37 having a predetermined shape corresponding to the surface dimension of the second optical component 20 (see FIG. 3A). The molding surface 37a includes a concave region 37b formed in a center portion of the molding die 37 and a flat region 37c on the periphery of the concave region 37b.

The ring member 106 is placed on a peripheral region 37d of the molding die 37 located radially outside the molding surface 37a (radially outside the peripheral edge of the molding surface 37a) (see FIG. 3B) so that the axial center of the ring member 106 coincides with the axial center of the molding surface 37a. Then, the molding die 37 and the first optical component 10 are arranged in such a manner that the molding surface 37a and the lens surface 10b oppose each other to have a predetermined gap therebetween and the axial center of the molding surface 37a coincides with the optical axis of the first optical component 10 (see FIG. 3C). With the molding die 37 being fixed, the first optical component 10 is linearly moved toward the molding die 37 until it comes into contact with the ring member 106. In this way, the thermosetting resin 38 is press-molded between the molding surface 37a and the lens surface 10b into a predetermined shape that enables the composite optical element 1 to exhibit predetermined optical performance. In order to linearly move the first optical component 10 toward the molding die 37, a hydraulic cylinder or an air cylinder may be used, or a ball screw may be used.

Then, heat is applied to the just-molded thermosetting resin 38 to cure the thermosetting resin 38. Thus, the second optical component 20 is coupled to the first optical component 10.

In this process, the thermosetting resin 38 before the heat application is much softer than the first optical component 10. Therefore, even if the lens surface 10b of the first optical component 10 is pressed onto the thermosetting resin 38, the shape of the lens surface 10b is not substantially changed. As the thermosetting resin 38 flows along the lens surface 10b and the ring member 106 to fit into the depressions of the uneven region 12 and the cutout portion 106a formed in the inner circumferential surface of the ring member 106, the thermosetting resin 38 is molded into a desired shape.

According to Embodiment 1, different materials are used for the first and second optical components 10 and 20. In this case, it is preferable to perform a certain treatment on the lens surface 10b to improve adhesion between the first optical component 10 and the second optical component 20 prior to the coupling of the second optical component 20 to the first optical component 10. More specifically, if the first optical component 10 is made of glass and the second optical component 20 is made of a resin, a coupling agent such as a silane coupling agent is preferably applied in advance to the lens surface 10b.

According to Embodiment 1 as described above, the ring member 106 configured to have a height from the lens surface 10b substantially uniform in the circumferential direction of the first optical component 10 is placed on the peripheral portion of the lens surface 10b of the first optical component 10. Therefore, the shape accuracy of the second optical component 20 is improved with ease and low cost. More specifically, as described above, in the process of molding the second optical component 20 coupled to the first optical component 10, the position of the first optical component 10 at the time when the molding of the second optical component 20 is finished is determined as the first optical component 10 comes into contact with the ring member 106. Therefore, space of a predetermined shape is easily and accurately defined between the lens surface 10b and the molding surface 37a (see FIG. 3D). If the position of the first optical component 10 at the time when the molding of the second optical component 20 is finished is determined without using the ring member 106, for example, a pulse motor or a servomotor may be used to control an angle of rotation of a ball screw for the positioning the first optical component 10. However, in this case, a high accuracy pulse motor or servomotor is required to improve the positioning accuracy, resulting in increase in equipment cost. According to the present invention, the position of the first optical component 10 at the time when the molding of the second optical component 20 is finished is determined as the first optical component 10 comes into contact with the ring member 106. Thus, the position of the first optical component 10 may be determined without using the high accuracy pulse motor or servomotor and the manufacturing cost may be reduced as compared with the case where the ring member 106 is not used. Further, a positioning error, which may be caused by backlash due to use of a drive transmission machine element such as the ball screw, is less likely to occur. Therefore, as compared with the case where the ring member 106 is not used, a distance between the lens surface 10b and the molding surface 37a at the time when the molding of the second optical component 20 is finished may be controlled with accuracy. As a result, the shape accuracy of the second optical component 20 may be improved. Therefore, the composite optical element 1 with desired optical performance may easily and accurately be manufactured.

The ring member 106 is configured to have a height h1 from the lens surface 10b substantially uniform in the circumferential direction of the first optical component 10. Therefore, as described above, the ring member 106 may advantageously prevent the first optical component 10 from tilting when the first optical component 10 comes into contact with the ring member 106 to mold the second optical component 20 into a predetermined shape. Further, the end face 106b of the ring member 106 becomes substantially vertical to the optical axis. For example, if the end face 106b is used as a mounting face for mounting the composite optical element 1 to an optical device, alignment of the optical axis may easily be performed. Further, for example, if the ring member 106 is made of a material harder than glass used as the material for the first optical component 10, the mounting face is improved in strength as compared with the case where the ring member 106 is not used.

According to Embodiment 1, the composite optical element 1 includes the lens barrel 108. The ring member 106 has an axial center which coincides with the optical axis and fitted into the lens barrel 108 so that the outer circumferential surface of the ring member 106 comes into contact with the inner circumferential surface of the lens barrel 108. As a result, the axial center of the lens barrel 108 and the optical axis coincide easily. As compared with the case where the lens barrel 108 is not used, the alignment of the optical axis which is required for mounting the composite optical element 1 to an optical device may easily be performed.

According to Embodiment 1, the inner circumferential surface of the ring member 106 has a stepped cutout portion 106a. In the molding of the second optical component 20, an excess of the thermosetting resin 38 flows into the cutout portion 106a. With the presence of the cutout portion 106a, cracking of the resin in a contracting state may be less likely to occur and lack of the filling amount of the thermosetting resin 38 may be canceled.

The cutout portion 106a is formed in part of the inner circumferential surface of the ring member 106 close to the end face 106b of the ring member 106. As the resin flows and cures in the cutout portion 106a, the ring member 106 is prevented from coming off the lens surface 10b.

In general, glass has higher softening temperature and hardness than those of the resin. Therefore, for example, when the first optical component 10 is made of glass and the second optical component 20 is made of the thermosetting resin 38 as described above, the first optical component 10 made of glass and configured into a desired shape may be used as the molding die to press-mold the softened resin into the desired shape. Then, the resin is cured to be coupled to the first optical component 10. Thus, the composite optical element 1 may be manufactured with ease and high shape accuracy.

According to Embodiment 1, the lens surface 10b includes the uneven region 12 and the smooth region 13. Therefore, optical power of the lens surface 10b may be varied between a center region R1 where the uneven region 12 is formed (see FIG. 1) and a peripheral region R2 where the smooth region 13 is formed (see FIG. 1).

Embodiment 2

Figure 4:
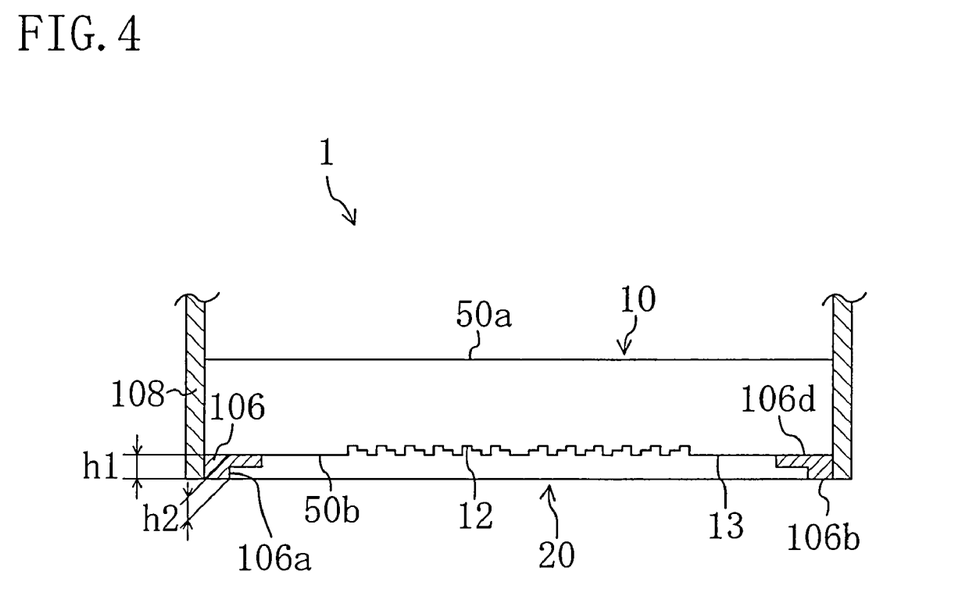
FIG. 4 is a sectional view illustrating a composite optical element according to Embodiment 2 of the present invention.

FIG. 4 is a sectional view illustrating a composite optical element 1 according to Embodiment 2 of the present invention. In this embodiment, the shapes of the first optical component 10 and the second optical component 20 are different from those of Embodiment 1. The components substantially the same as those shown in FIG. 1 are indicated by the same reference numerals to omit detailed explanation of them. The first optical component 10 is in the form of a flat parallel plate and has a component surface 50a in which light enters and a component surface 50b from which the entering light is emitted. The component surfaces 50a and 50b are parallel to and oppose each other. The component surface 50b includes an uneven region 12 in the center portion thereof and a smooth region 13 surrounding the uneven region 12. The uneven region 12 of Embodiment 2 is configured of a stepped diffraction plane having a stepped section.

The composite optical element 1 of Embodiment 2 is manufactured by the same method as that described in Embodiment 1. The molding surface 37a of the molding die 37 used to couple the second optical component 20 to the first optical component 10 is flat to correspond to the shape of the surface of the second optical component 20.

The thus-configured composite optical element 1 may be as advantageous as that of in Embodiment 1.

Other Embodiments

Figure 6:
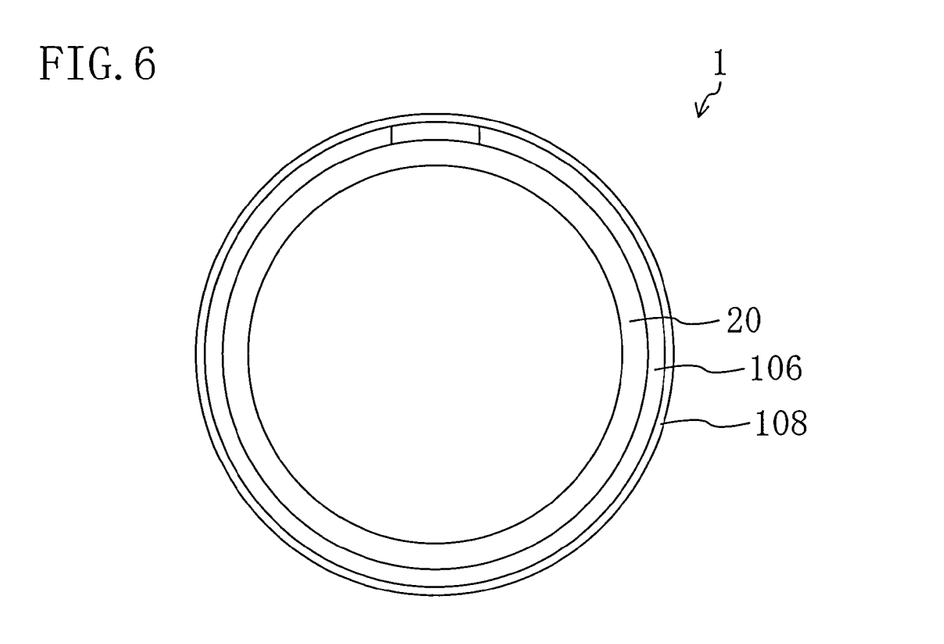
FIG. 6 is a view corresponding to FIG. 5 illustrating another embodiment.
Figure 7:
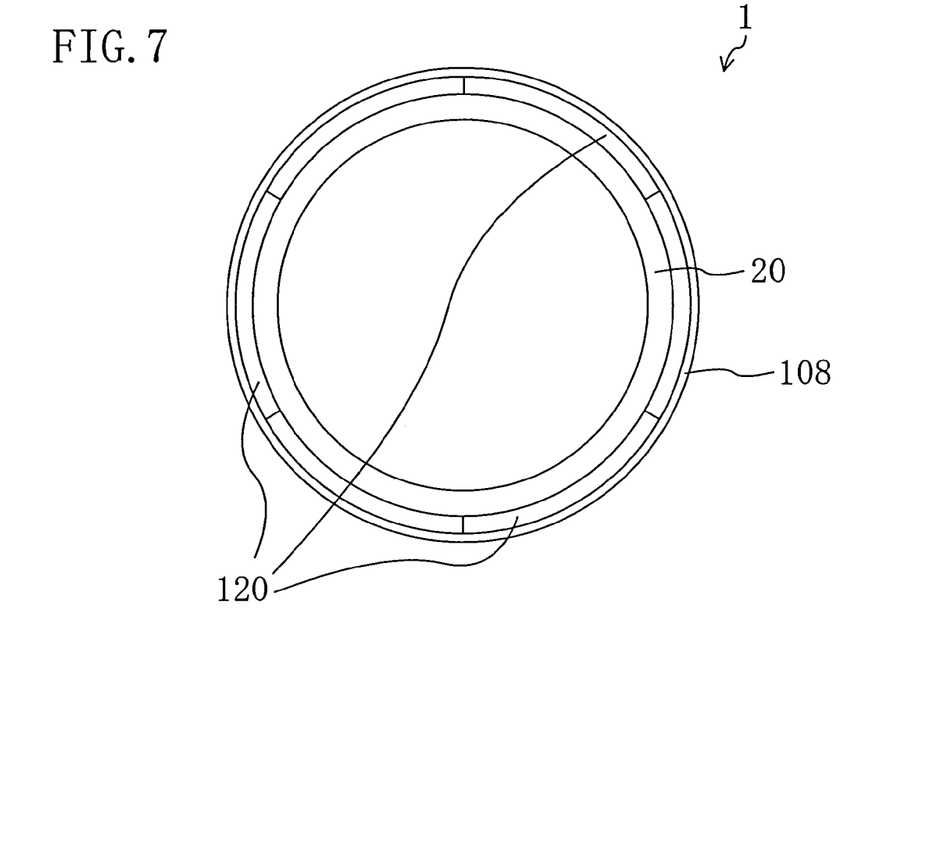
FIG. 7 is a view corresponding to FIG. 5 illustrating still another embodiment.

The structure disclosed herein is not limited by the foregoing embodiments and includes various modifications. For example, the ring member 106 is employed as the protrusion (abutment) in the foregoing embodiments. However, this is not a restrictive example. For example, another example ring member 106 which is partially cut out in the circumferential direction as shown in FIG. 6 may be employed, or a plurality of separated members 120 arranged at predetermined intervals along the circumference of the first optical component 10 as shown in FIG. 7 may be employed. The protrusion (abutment) may be a rectangular frame-shaped member. That is, any member may be used as the protrusion (abutment) as long as its height h1 from the lens surface 10b is uniform in the circumferential direction of the first optical component 10.

Figure 8:
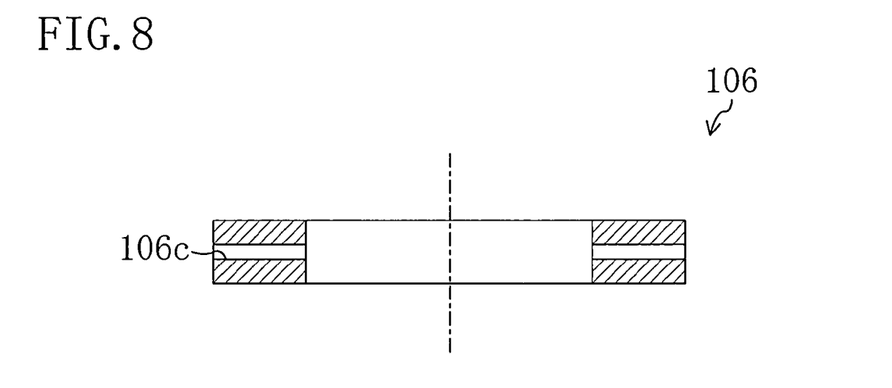
FIG. 8 is a sectional view illustrating a ring member according to yet another embodiment.

In the foregoing embodiments, the inner circumferential surface of the ring member 106 has a stepped cutout portion 106a. However, the cutout portion may not necessarily be stepped. Further, a hole 106c as shown in FIG. 8 may be formed instead of the cutout portion 106a.

In the foregoing embodiments, the first optical component 10 is moved toward the fixed molding die 37 to mold the second optical component 20 coupled to the first optical component 10. However, this is not a restrictive example. For example, the molding die 37 may be moved toward the fixed first optical component 10.

In the foregoing embodiments, the thermosetting resin 38 is placed on the molding surface 37a to form the second optical component 20 coupled to the first optical component 10. However, this is not a restrictive example. For example, the thermosetting resin 38 may be placed on a probable coupling plane of the first optical component 10 to which the second optical component 20 will be coupled, i.e., on the lens surface 10b of Embodiment 1 or part of the component surface 50b of Embodiment 2 where the second optical component 20 will be coupled.

In the foregoing embodiments, the ring member 106 is placed on the peripheral region 37d of the molding die 37 and then the first optical component 10 is moved toward the molding die 37 to mold the second optical component 20 coupled to the first optical component 10. However, this is not a restrictive example. For example, the ring member 106 may be coupled in advance to a surface of the first optical component 10 to which the second optical component 20 will be coupled, i.e., to the lens surface 10b of Embodiment 1 or the component surface 50b of Embodiment 2, and then the first optical component 10 may be moved toward the molding die 37.

In the foregoing embodiments, the ring member 106 and the second optical component 20 are placed on a surface from which light is emitted, i.e., on the lens surface 10b of Embodiment 1 or the component surface 50b of Embodiment 2. However, this is not a restrictive example. For example, the ring member 106 and the second optical component 20 may be placed on a surface in which light enters, i.e., the lens surface 10a of Embodiment 1 or the component surface 50a of Embodiment 2. Alternatively, the ring member 106 and the second optical component 20 may be placed on both of the lens surfaces 10a and 10b or both of the component surfaces 50a and 50b.

In the foregoing embodiments, the composite optical element 1 includes the lens barrel 108. However, the lens barrel 108 is not necessarily essential.

The smooth region 13 of Embodiment 1 is configured of an aspherical plane and that of Embodiment 2 is configured of a flat plane. However, this is not a restrictive example. The smooth region 13 may be configured of, for example, a spherical plane, an oval spherical plane or a toric plane.

The uneven region 12 of Embodiment 1 is configured of a diffraction plane having a sawtooth section, while that of Embodiment 2 is configured of a stepped diffraction plane. However, these are not restrictive examples. The uneven region 12 may be configured of, for example, a diffraction plane having a rectangular section or a sinusoidal section, a lens array plane including a plurality of convex or concave lens surfaces, a phase difference plane, or an antireflective plane having an antireflective structure (e.g., a structure including a plurality of conical projections or depressions arranged at a pitch smaller than the wavelength of target light to block the reflection of the target light).

The first optical component 10 of Embodiment 1 is configured of a biconvex lens, while that of Embodiment 2 is configured of an optical element in the form of a flat parallel plate. However, these are not restrictive examples. The first optical component 10 may be configured of, for example, a meniscus lens or a biconcave lens.

In the foregoing embodiments, glass is used as the material of the first optical component 10 and the resin is used as the material of the second optical component 20. However, these are not restrictive examples. For example, a resin may be used as the material of both of the first and second optical components 10 and 20. In this case, the composite optical element 1 may be manufactured with ease and low cost without using expensive and complex equipment such as a high-temperature heating device generally used in the manufacture of the first and second optical components 10 and 20 one of which is made of glass. Alternatively, glass may be used as the material for both of the first and second optical components 10 and 20. Use of glass may advantageously provide the composite optical element 1 with high transparency and durability. In this case, the glass transition temperature and the softening temperature of the first optical component 10 may preferably be higher than those of the second optical component 20. More preferably, the second optical component 20 may be made of low-melting glass.

In the foregoing embodiments, the thermosetting resin 38 is used as the material of the second optical component 20. However, this is not a restrictive example. For example, a UV curing resin and an electron beam curing resin may be used. In this case, the resin is cured in a short time and productivity of the composite optical element 1 may be improved.

In the foregoing embodiments, the ring member 106 is coupled to the first optical component 10 with the second optical component 20 interposed therebetween However, this is not a restrictive example. For example, the ring member 106 may directly be coupled to the first optical component 10.

INDUSTRIAL APPLICABILITY

The present disclosure may be advantageous to a composite optical element including a first optical component and a second optical component coupled to the first optical component, particularly to a composite optical element mounted on an optical device.

The invention claimed is:

1. A composite optical element comprising a first optical component and a second optical component coupled to one surface of the first optical component with a peripheral portion of the one surface exposed, the composite optical element further comprising
   a protrusion which is placed on the peripheral portion of the one surface of the first optical component and has a height from the one surface substantially uniform in a circumferential direction of the first optical component, wherein
   the protrusion is coupled to at least one of the first optical component and the second optical component.

2. The composite optical element of claim 1, wherein
   the protrusion is divided into a plurality of protrusions arranged at predetermined intervals in the circumferential direction of the first optical component.

3. The composite optical element of claim 1, wherein
   each of the first optical component and the second optical component is made of glass or a resin.

4. The composite optical element of claim 1, wherein
   at least part of a coupling surface of the first optical component to which the second optical component is coupled is a diffraction plane.

5. The composite optical element of claim 1, wherein
   the protrusion is configured of a ring member and
   an axial center of the ring member coincides with an optical axis of the first optical component.

6. The composite optical element of claim 5, wherein
   the ring member is partially cut out in the circumferential direction.

7. The composite optical element of claim 5, wherein
   a cutout portion or at least a single hole is formed in an inner circumferential surface of the ring member.

8. The composite optical element of claim 5, further comprising a lens barrel capable of being mounted to an optical device, wherein
   the ring member is fitted in the lens barrel so that an outer circumferential surface of the ring member is in contact with an inner circumferential surface of the lens barrel.

9. The composite optical element of claim 1, wherein
   the protrusion is in contact with the second optical component.

10. The composite optical element of claim 9, wherein
    the height of the protrusion is equal to a height of a peripheral portion of the second optical component.

* * * * *